UNITED STATES PATENT OFFICE.

WILLIAM J. MENZIES, OF ST. HELEN'S, ENGLAND.

PROCESS FOR THE MANUFACTURE OF SULPHATE OF SODA.

SPECIFICATION forming part of Letters Patent No. 224,101, dated February 3, 1880.

Application filed June 10, 1879.

*To all whom it may concern:*

Be it known that I, WILLIAM J. MENZIES, of St. Helen's, in the county of Lancaster, England, have invented a new and useful Process for Making Pure Sulphate of Soda, which process is fully set forth in the following specification.

My invention relates to the production of sulphate of soda suitable for glass-making, or as a substitute for Glauber's salt and other well-known uses; and it consists in utilizing the waste products from the manufacture of nitric acid and muriatic acid known, respectively, "as niter-cake" and "muriatic-acid cylinder-cake," and obtaining therefrom an almost pure sulphate of soda, white and free from iron, suitable for the manufacture of glass of good quality, and that can be also used as a substitute for Glauber's salt, also obtaining an anhydrous sulphate soda quite free from iron or free acid, hitherto not commercially obtained.

It is well known that niter-cake contains a large quantity of free sulphuric acid and iron in the form of soluble and insoluble salts, besides other insoluble substances. Cylinder salt-cake, in addition to free sulphuric acid, iron salts, and insoluble substances, always contains more or less of chloride of sodium, generally more than sufficient to decompose all the free sulphuric acid when heated. Owing to the above-mentioned impurities, both these substances are quite unfit for the manufacture of good glass, nor can they be used as a substitute for Glauber's salt.

My process of purifying is as follows: I throw in and melt down in an ordinary reverberatory furnace a quantity of niter-cake. I then add a sufficient quantity of the cylinder salt-cake, (previously roughly ground to facilitate decomposition,) and work them in the furnace as in the usual way. The heat of the furnace, causes the chloride sodium and free sulphuric acid to react upon each other, forming sulphate soda with the evolution of muriatic-acid vapors. To as nearly as possible completely neutralize the chloride of sodium, I so regulate the quantities as to have the free sulphuric acid slightly in excess.

The composition of the crude cakes varies considerably. The proportions to be used can be ascertained by analysis. In practice, however, a good workman will soon be able to judge, from the appearance of the charge, the relative quantities to be used, and to draw it containing not more than two-tenths of one per cent. of chloride of sodium and three per cent. of sulphuric acid.

It will be evident that in the above-described stage of the process niter-cake can be used alone, and the large excess of free sulphuric acid removed by the addition of common salt in the furnace, or that muriatic-acid cylinder-cake can be used alone and sufficient vitriol poured upon it, after rough grinding, to decompose the chloride of sodium when heated in the furnace. The muriatic-acid vapors evolved may be condensed, if desired, in suitable apparatus.

After the furnacing operation I put the product obtained into a pan or other suitable vessel for dissolving it in water, either heated and agitated by steam or by fire direct, thus dissolving the rough sulphate of soda. I at the same time add a sufficient quantity of alkali (preferably carbonate of soda) to neutralize the free sulphuric acid and render the solution slightly alkaline, and also a small quantity of hypochlorite of lime or other bleaching-powder to fully oxidize the hot saturated solution thus obtained. I then either allow it to settle for a few hours, when it will become perfectly clear, or I pass it through any form of suitable filtering apparatus. By this process all the free sulphuric acid is removed, and, owing to the solution being rendered alkaline and perfectly oxidized, the whole of the iron is precipitated as an insoluble peroxide and subsides or is separated by filtration, together with any alumina, silica, or insoluble matter contained in the original materials.

The filtrate or sediment of iron and other impurities obtained in the above-described manner can be washed, either by filtration or decantation with water, so as to remove all the sulphate soda contained in it, and the weak liquors so obtained used instead of water to dissolve the rough sulphate soda, as above described.

I now take the clear saturated solution obtained from the above-mentioned process and evaporate it down to dryness in a reverberatory furnace; or, if not required anhydrous, it can be evaporated down to a monohydrate in a shallow iron dish-shaped pan, frequently turning it over during the operation to prevent its sticking. In this way a perfectly white sulphate soda may be obtained from niter-cake, cylinder-cake, or any other impure form of sulphate soda contaminated with free sulphuric acid, chloride sodium, iron, or insoluble substances, the product being perfectly free from iron, free acid, and insoluble substances, and, containing a mere trace of chloride, is admirably adapted for making the best qualities of glass or for use as a substitute for Glauber's salt.

Having thus described my invention, what I claim as new, and desire to secure by Letters Patent, is—

1. The above-described process of obtaining a pure sulphate of soda from niter-cake and muriatic-acid cylinder-cake, by neutralizing the free acid of the one and the free chloride of sodium of the other, by treating them in a reverberatory furnace, either together or singly, with the addition, respectively, of chloride of sodium or sulphuric acid, and then precipitating the salts of iron and other impurities from a hot saturated solution of the product by the addition of an alkali or alkaline earth and bleaching-powder.

2. The process of removing the free acid and at the same time precipitating the salts of iron and other impurities from an impure sulphate of soda by the addition of an alkali or alkaline earth and bleaching-powder to a hot saturated solution of the same.

3. As a new article of manufacture, an anhydrous sulphate of soda having the qualities specified, and substantially free from all traces of iron.

W. J. MENZIES.

Witnesses:
R. S. CHILD, Jr.,
JOEL ZANE, Jr.